United States Patent [19]

Spence et al.

[11] Patent Number: 5,425,035
[45] Date of Patent: Jun. 13, 1995

[54] ENHANCED DATA ANALYZER FOR USE IN BIST CIRCUITRY

[75] Inventors: Nicholas J. Spence, Mesa; Jerome A. Grula, Chandler; Glen D. Caby, Gilbert, all of Ariz.

[73] Assignee: Motorola, Inc., Schaumburg, Ill.

[21] Appl. No.: 943,623

[22] Filed: Sep. 11, 1992

[51] Int. Cl.⁶ .............................................. H04B 17/00
[52] U.S. Cl. .................................. 371/22.4; 371/22.3
[58] Field of Search ............... 371/22.4, 22.3, 22.5, 371/25.1, 26

[56] References Cited

U.S. PATENT DOCUMENTS 4,598,401 7/1986 Whelan ........................... 371/22.4
4,817,093 3/1989 Jacobs et al. ..................... 371/22.4

*Primary Examiner*—Emanuel T. Voeltz
*Assistant Examiner*—Edward Pipala
*Attorney, Agent, or Firm*—Rennie William Dover

[57] ABSTRACT

A data analyzer for use in BIST circuitry has been provided. The data analyzer allows both comparison analysis and signature analysis to be performed on a circuit response data stream. The data analyzer includes a plurality of data registers which are serially-coupled and where each data register is capable of performing comparison analysis and signature analysis on one data bit of the circuit response data stream. This allows the circuit under test can be completely and thoroughly tested for faults.

16 Claims, 2 Drawing Sheets

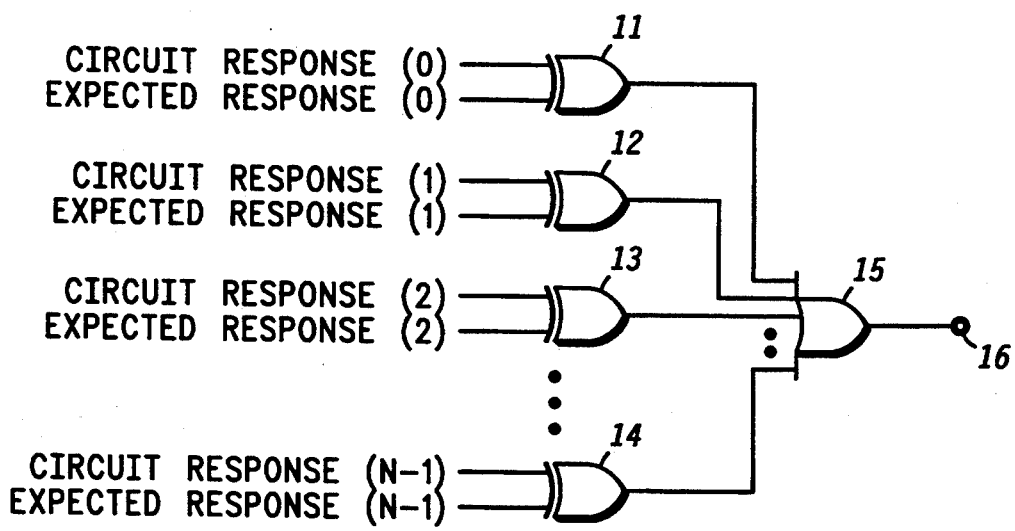
FIG. 1
—PRIOR ART—
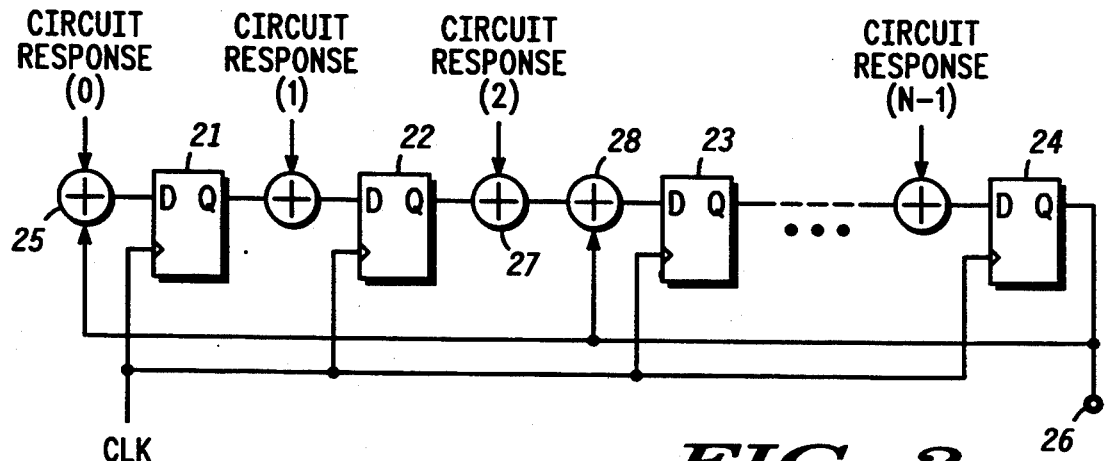
FIG. 2
—PRIOR ART—
FIG. 3
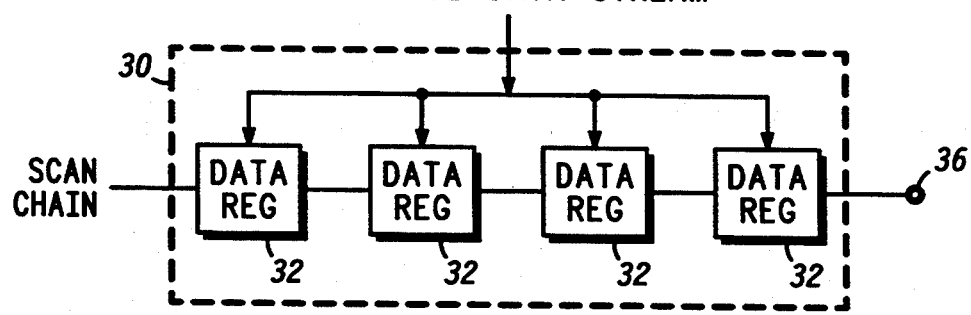

ENHANCED DATA ANALYZER FOR USE IN BIST CIRCUITRY

FIELD OF THE INVENTION

The present invention relates, in general, to built-in self test (BIST) circuitry, and more particularly, to a data analyzer for performing a complete self test of a device.

BACKGROUND OF THE INVENTION

The acceptance of compiler-developed integrated circuits, often referred to as application specific integrated circuits (ASICs) or standard cells, developed an increased need for improved test techniques for the large variety of circuits produced by those methods. Improved semiconductor manufacturing procedures provided increased complexity semiconductor devices, while compiler design techniques provided a means to rapidly develop designs of many different semiconductor devices. The resulting proliferation of complex ASIC semiconductor devices increased the need for test methods that were flexible, and that could be compiled concurrently with an ASIC design. One technique, generally referred to as built-in self-test (BIST), placed circuitry on the ASIC device to accomplish testing of the ASIC device. BIST became increasingly important to ASIC devices that included blocks of static random access memory (SRAM) that were embedded on the ASIC device.

There are essentially three elements associated with the BIST function: 1) the BIST controller, 2) the data generator, and 3) the data analyzer. The BIST controller provides synchronization and control signals for the BIST operation. The data generator provides a stimulus to the circuit (ASIC) under test. Finally, the data analyzer provides a mechanism for compacting the response from the circuit under test to form a result.

A data analyzer typically performs two types of data analysis: 1) comparison analysis, and 2) signature analysis. In comparison analysis, an output stream from the circuit under test is compared with an expected data stream. Whenever a difference is found between the two data streams, an error is flagged and is held in the data analyzer. At the end of the test the contents of the data analyzer can be examined to locate the fault. An advantage of comparison analysis is that fault location can be easily performed. However, comparison analysis has a disadvantage that a failure in the comparison analysis circuitry may prevent faults from being detected.

In signature analysis, an output from the circuit under test is combined with the contents of the data analyzer using a linear feedback shift register (LFSR). The LFSR ensures that the response and the time form part of the signature. At the end of the test, the resulting signature in the LFSR's can be scanned out and compared with a known good signature. Signature analysis has the advantage that its tests all the components of the BIST as well as the circuit under test. However, disadvantages of signature analysis are that the location of the fault cannot be determined, and that there is a small probability that a faulty circuit may not be recognized because of aliasing of the signature.

Prior art BIST circuitry includes circuitry for performing either comparison analysis or signature analysis, but not both. The primary reason may be that incorporating both types of analysis within an ASIC would consume too much circuitry. However, each type of analysis has its disadvantages as aforedescribed. As a result, in order to perform a complete and thorough testing of an ASIC both comparison analysis and signature analysis are needed.

Hence, there exists a need to provide an improved data analyzer for performing both comparison analysis and signature analysis while using minimal circuitry thereby performing complete self test of an ASIC.

BRIEF DESCRIPTION OF THE DRAWINGS

FIG. 1 is a detailed schematic diagram illustrating a prior art data analyzer for implementing comparison analysis;

FIG. 2 is partial schematic/block diagram illustrating a prior art data analyzer for implementing signature analysis;

FIG. 3 is a block diagram illustrating a circuit for implementing both comparison analysis and signature analysis in accordance with the present invention;

DETAILED DESCRIPTION OF THE DRAWINGS

Figure 4:
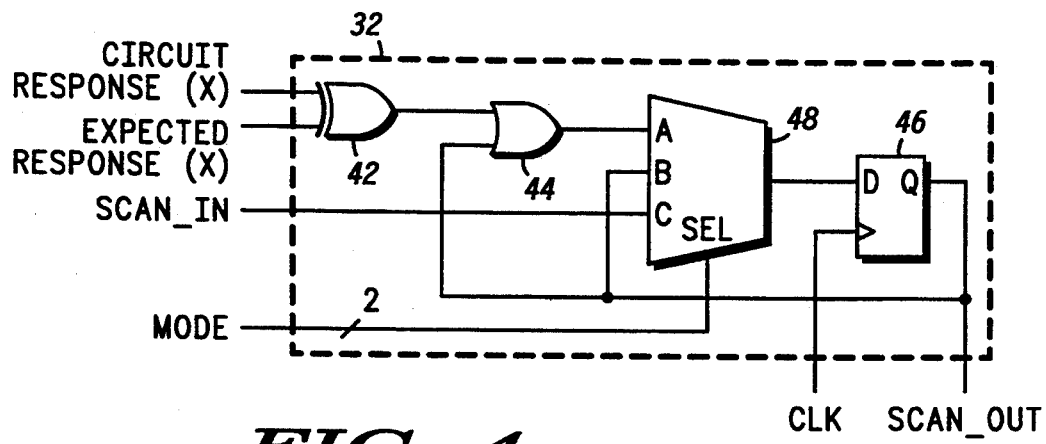
FIG. 4 (s a partial schematic/block diagram illustrating a first embodiment of the data registers shown in FIG. 3 for performing comparison analysis.

Referring to FIG. 1, a detailed schematic diagram illustrating a prior art data analyzer for performing comparison analysis is shown. The data analyzer includes exclusive OR (XOR) gates 11–14 each having outputs coupled to respective inputs of OR gate 15. The first inputs of exclusive OR gates 11–14 are coupled to respectively receive a circuit response signal (CIRCUIT RESPONSE (X)), while the second input of exclusive OR gates 11–14 are coupled to respectively receive an expected response signal (EXPECTED RESPONSE (X)). The output of OR gate 15 is coupled to terminal 16. It is understood that although only four exclusive OR gates are shown, there exists N exclusive OR gates for comparing N circuit responses to N expected responses.

In operation, the output data stream from the circuit (the circuit response) is compared with an expected data stream via exclusive OR gates 11–14 such that whenever a difference is found between the two data streams, a logic one appears at the output of the respective exclusive OR gate. Further, this logic one propagates through OR gate 15 and appears at terminal 16. As a result, at the end of the testing, the data stream appearing at terminal 16 can be examined for the occurrence of logical ones thereby indicating that a fault has occurred.

Comparison analysis has the ability to determine the location of the fault due to the orderly output sequence appearing at terminal 16. However, if a failure occurs in the comparison analysis circuitry, then such a failure may prevent faults from being detected. For example, if the output of exclusive OR gate 11 is stuck at a logic zero, then even if CIRCUIT RESPONSE (0) is different from EXPECTED RESPONSE (0), a logic zero will still appear at the output of exclusive OR gate 11. Thus, the error will not be detected.

Referring to FIG. 2, a partial schematic/block diagram illustrating a prior art data analyzer for providing signature analysis is shown. Shift registers 21-24 are coupled to form a linear feedback shift register (LFSR) wherein the output of the highest order shift register stage (24) is fed back to an input of one or more other shift register stages (21-23). Each stage has a clock input coupled to receive signal CLK. Shift register 21 has a data input coupled, via coupler 26, to receive the exclusive OR of CIRCUIT RESPONSE (0) and the output of shift register of 24. Shift register 22 has a data input coupled to receive the output of shift register 21 and CIRCUIT RESPONSE(1). Shift register 23 has a data input coupled, via couplers 27 and 28, to receive the exclusive OR of the output of shift register 22, CIRCUIT RESPONSE (2) and the output of shift register 24. Finally, shift register 24 has a data input coupled to receive CIRCUIT RESPONSE (N−1) and the output of a previous shift register. It is understood that although only four shift registers are shown, there exists N shift registers to account for the N circuit responses. Further, it is understood that the feedback of the output of shift register 24 which is the highest order feedback stage, is chosen such that the output sequence appearing at terminal 26 generates a predetermined signature sequence. It is also understood that this procedure of accumulating data, shifting the data with feedback, and accumulating more data, etc. is referred to as parallel signature analysis and shift registers 21-24 are referred to as parallel signature analysis registers.

At the end of the self test, a word that represents a signature of all the information stored in the SRAM will be contained in the shift registers. This signature can be compared to a signature of a known good SRAM to determine if the SRAM under test had any failures. This signature analysis has the advantage that it tests all components of the BIST as well as the circuit under test. However, location of the fault cannot be determined through signature analysis. Further, there is a small probability that a faulty circuit may not be recognized because of aliasing of the signature wherein different circuit responses may provide the predetermined desired signature.

The present invention recognizes the flaws in both comparison and signature analysis and provides an enhanced data analyzer that performs both types of analysis while requiring minimum gate count. In doing so, the present invention implements a bit slice approach wherein the data analyzer is made up of a number of data registers, one for each data bit being analyzed. Referring to FIG. 3, BIST data analyzer 30 is shown for analyzing a 4-bit wide circuit response data stream. BIST data analyzer 30 includes four data registers as denoted by reference number 32 wherein each data register analyzes one bit of the four bit circuit response data stream. It is understood that although only four data registers are shown for analyzing a four bit data stream (typically from a 4-bit wide RAM), the number of data registers may be tailored to the specific size of the RAM being tested. For example, if an 8-bit RAM was being tested, data analyzer 30 would include a chain of at least 8 data registers. As can be seen from FIG. 3, the data registers (32) are serially coupled wherein the output of a previous data register is coupled to the input of a succeeding data register thereby allowing a SCAN CHAIN signal to be read from the data registers. Further, the output of the last and highest order data register is coupled to terminal 36.

The present invention includes circuitry to be used within the data registers (32) such that both comparator and signature analysis may be performed on each 4-bit circuit response data stream. Referring to FIG. 4, a first embodiment for data registers 32 which includes circuitry for performing comparison analysis is shown. Data register 32 shown in FIG. 4 is utilized for analyzing one circuit response data bit. In particular, data register 32 includes exclusive OR gate 42 having a first input coupled to receive CIRCUIT RESPONSE (X) which may be any one of the bits from the 4-bit circuit response data stream. A second input of exclusive OR gate 42 is coupled to receive EXPECTED RESPONSE (X) which is the expected data bit value for CIRCUIT RESPONSE (X). The output of exclusive OR gate 42 is coupled to a first input of OR gate 44, while the second input of OR gate 44 is coupled to the output of shift register 46. The output of OR gate 44 is coupled to a first input (A) of multiplexer 48. The second input(B) of multiplexer 48 is coupled to the output of shift register 46, while the third input (C) of multiplexer 48 is coupled to receive signal SCAN_IN. The select input of multiplexer 48 is coupled to receive 2-bit wide control signal MODE. The output of multiplexer 48 is coupled to the data input of shift register 46. Shift register 46 has a clock input coupled to receive signal CLK and an output for providing signal SCAN_OUT.

In operation, data register 32 can operate in one of three different modes depending upon the logical values of signal MODE: 1) the comparison analysis mode, 2) the hold mode, and 3) the scan mode. During the comparison analysis mode, multiplexer 48 is set up to pass the signal appearing at its first input to its output. Data register 32 then performs comparison analysis on CIRCUIT RESPONSE (X) such that when CIRCUIT RESPONSE (X) is different from the EXPECTED RESPONSE (X), the output of exclusive OR gate 42 is a logic one. Thus logic one propagates through OR gate 44 and multiplexer 48 and appears at the data input of shift register 46. Thus, upon the next clocking of shift register 46, a logic one will appear at the output of shift register 46. It is understood that 0R gate 44 is provided to ensure that once an error has been detected and propagates to the output of shift register 46, the logic one that appeared at the first input of multiplexer 48 remains set.

During the hold mode, multiplexer 48 is set up to pass the signal appearing at its second input to its output thereby holding the result once the BIST mode is complete. Thus, during the hold mode, the output of shift register 46 is simply feed through multiplexer 48 back to the data input of shift register 46. This may be particularly useful where there are multiple RAMS to test such that while a second RAM is being tested, the test results of a first RAM may be held.

During the scan mode, multiplexer 48 is set up to pass the signal appearing at its third input to its output. In the scan mode, signal SCAN_IN is passed through multiplexer 48 and to the data input of shift register 46 and upon clocking shift register 46, signal SCAN_IN appears at the output of shift register 46 which provides signal SCAN_OUT. By providing data register 32 with a SCAN_IN and a SCAN_OUT signal, a scan chain can be formed so that the results for each bit can be read out. It is understood that signals SCAN_IN and SCAN_OUT allow for the existence of the SCAN CHAIN signal shown in FIG. 3, wherein signal SCAN_IN of a data register is the SCAN_OUT signal of a previous data register. For example, if data register 32 of FIG. 4 was in the position of the second data register shown of FIG. 3, the SCAN_IN signal of data register 32 of FIG. 4 would be the SCAN_OUT signal of the first data register shown in FIG. 3, while the SCAN_OUT signal of data register 32 of FIG. 4 provides the SCAN_IN signal for the third data register of FIG. 3.

Figure 5:
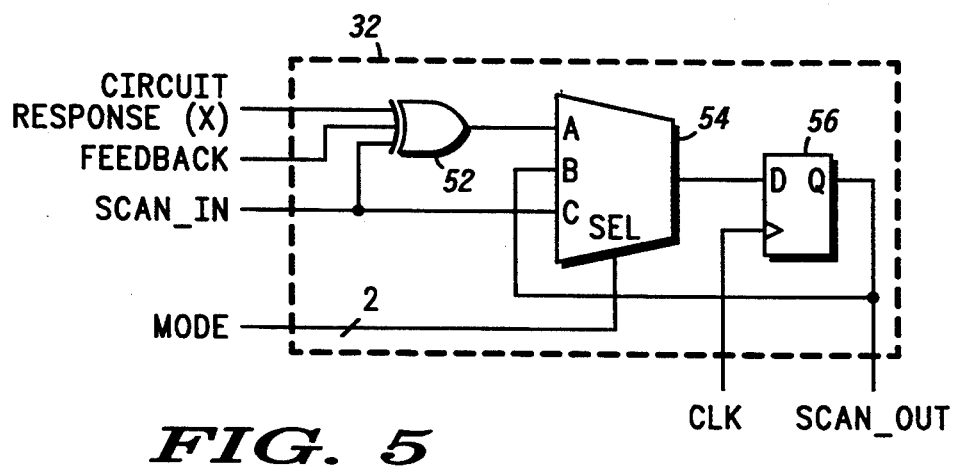
FIG. 5 is a partial schematic/block diagram illustrating a second embodiment of the data registers shown in FIG. 3 for performing signature analysis.

Referring to FIG. 5, a second embodiment of data register 32 which includes circuitry for performing signature analysis is shown. In particular, data register 32 of FIG. 5 includes exclusive OR gate 52 having a first input coupled to receive CIRCUIT RESPONSE (X), a second input coupled to receive signal FEEDBACK, and a third input coupled to receive signal SCAN_IN. The output of exclusive OR gate 52 is coupled to the first input (A) of multiplexer 54. Further, the second input (B) of multiplexer 54 is coupled to the output of shift register 56, while the third input (C) of multiplexer 54 is coupled to receive signal SCAN_IN. The output of multiplexer 54 is coupled to the data input of shift register 56 the latter having a clock input coupled to receive signal CLK. Further, the output of shift register 56 provides signal SCAN_OUT.

Data register 32 of FIG. 5 combines CIRCUIT RESPONSE (X) with the contents of a previous data register via signal SCAN_IN and a linear feedback shift register term via signal FEEDBACK. That is, signal feedback is the signal appearing at the output of the highest order shift register in the scan chain. Thus, referring to FIG. 3, the last, right-most data register is the highest order data register in the scan chain. It is understood that data register 32 of FIG. 5 always includes 3-input exclusive OR gate 52, however, a feedback signal is applied only to selected data registers in the scan chain depending upon what end-result signature polynomial is desired wherein if a feedback signal is not applied to an input of exclusive OR gate 52 then its respective input is tied low. Data register 32 of FIG. 5 can operate in one of three different modes depending upon the logic state of signal MODE: 1) the signature analysis mode, 2) the hold mode, and 3) the scan mode. During the signature analysis mode, multiplexer 54 is set up to pass the signal appearing at its first input to its output. Data register 32 combines signal FEEDBACK, signal SCAN_IN and CIRCUIT RESPONSE (X) via exclusive OR gate 52 thereby allowing signature analysis to be performed on the data appearing on CIRCUIT RESPONSE (X). Thus, if the proper logic value does not result at the output of XOR gate 52, the signature caused by this fault will propagate through multiplexer 54 and shift register 56 and eventually be detected at the end of test assuming that aliasing has not occurred.

No additional description for the hold and scan modes for the circuit of FIG. 5 is needed because they operate identical to the hold and scan modes as aforedescribed for FIG. 4.

Figure 6:
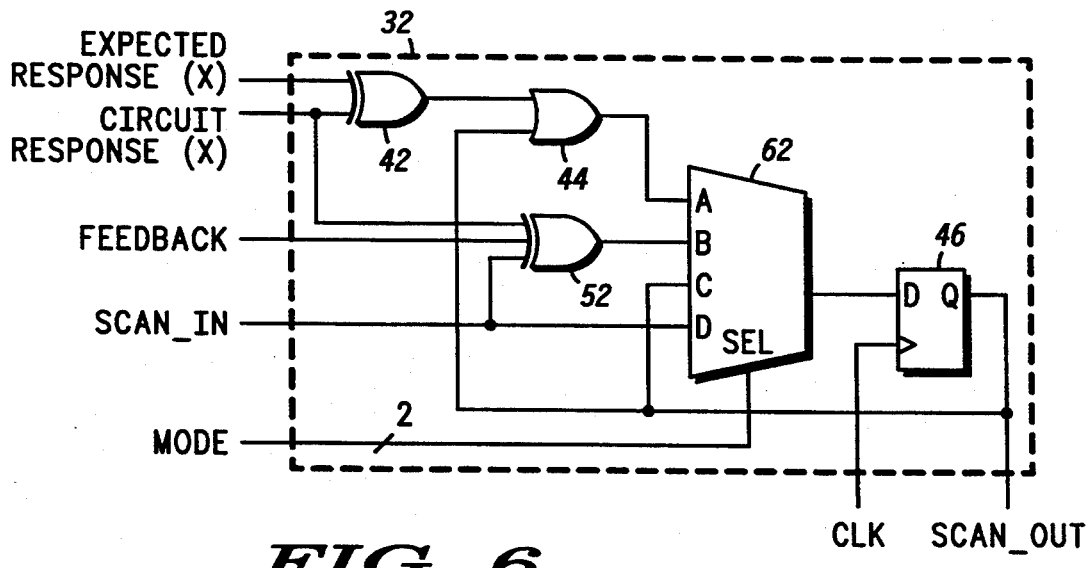
FIG. 6 is a partial schematic/block diagram illustrating a third embodiment of the data registers shown in FIG. 3 for performing both comparison analysis and signature analysis.

Referring to FIG. 6, a third embodiment for data registers 32 which includes circuitry for performing both comparison and signature analysis is shown. It is understood that components shown in FIG. 6 which are identical to components shown in FIGS. 4 and 5 are identified by the same reference numbers. Data register 32 of FIG. 6 further includes four-input multiplexer 62 having a first input (A) coupled to the output of OR gate 44, a second input (B) coupled to the output of exclusive OR gate 52, a third input (C) coupled to the output of shift register 46, and a fourth input (D) coupled to receive signal SCAN_IN. Essentially, multiplexer 62 incorporates the functions of both multiplexers 48 and 54 such that data register 32 of FIG. 6 can operate in one of four modes: 1) the comparison analysis mode, 2) the signature analysis mode, 3) the hold mode, and 4) the scan mode. It is understood that when the circuitry of data register 32 of FIG. 6 is incorporated in the data registers of data analyzer 30 of FIG. 3, data analyzer 30 can perform both comparison analysis and signature analysis on the four bit data circuit response data stream. In particular, during the first mode, data register 32 of FIG. 6 performs comparison analysis, and during the second mode data register 32 of FIG. 6 performs signature analysis wherein the results of each analysis may be read separately or combined at the end. As a result, the present invention provides an enhanced data analyzer (30) for performing both comparison and signature analysis while utilizing minimum circuitry. As an example, the circuit shown in FIG. 4 requires a total gate count of 20 while the circuit shown in FIG. 5 requires a total gate count of 21. However, combining the functions of data registers of FIGS. 4 and 5 to form the data register of FIG. 6, a total gate count of only 29 is needed.

By now it should be apparent from the foregoing discussion that a novel data analyzer for use in BIST circuitry has been provided. The data analyzer allows both comparison analysis and signature analysis to be performed on a circuit response data stream. The data analyzer includes a plurality of data registers which are serially-coupled and where each data register is capable of performing comparison analysis and signature analysis on one data bit of the circuit response data stream. Thus, the circuit under test can be completely and thoroughly tested for faults.

While the invention has been described in conjunction with specific embodiments thereof, it is evident that many alterations, modifications and variations will be apparent to those skilled in the art in the light of the foregoing description. For example, although the invention has been described for testing a RAM, it is understood that the present invention may be utilized to test any type of logic block. Accordingly, it is intended to embrace all such alterations, modifications and variations in the appended claims.

We claim:

1. A data analyzer for use in BIST circuitry for performing both comparison analysis and signature analysis on a circuit, comprising:

a plurality of data registers being serially-coupled and responsive to a plurality of output signals from the circuit, each one of said plurality of data registers having an input and an output and including:

(a) first means for comparing one of said output signals from the circuit to an expected signal, said first means having an output;

(b) second means for combining said one of said output signals from the circuit with another one of said output signals from the circuit, said second means having an output;

(c) third means responsive to a control signal for alternately selecting whether said plurality of data registers are performing comparison analysis or signature analysis, said third means having a plurality of inputs, a first one of said plurality of inputs being coupled to said output of said first means, a second one of said plurality of inputs being coupled to said output of said second means, a third one of said plurality of inputs being coupled to said input of its respective data register for receiving an output signal from a previous adjacent data register of said plurality of data registers, said third means having an output; and (d) fourth means responsive to a clock signal for storing a value appearing at said output of said third means, said fourth means having an input coupled to said output of said third means, said fourth means having an output coupled to said output of its respective data register.

2. The data analyzer according to claim 1 wherein said first means includes a first gate having first and second inputs and an output, said first input of said first gate being coupled to receive said one of said output signals from the circuit, said second input of said first gate being coupled to receive said expected signal, said output of said first gate being coupled to said first one of said plurality of inputs of said third means.

3. The data analyzer according to claim 2 wherein said first means further includes a second gate being coupled between said output of said first gate and said third means, said second gate having first and second inputs and an output, said first input of said second gate being coupled to said output of said first gate, said second input of said second gate being coupled to said output of said fourth means, said output of said second gate being coupled to said first one of said plurality of inputs of said third means.

4. The data analyzer according to claim I wherein said second means includes a first gate having first and second input and an output, said first input of said first gate being coupled to receive said one of said output signals from the circuit, said second input of said first gate being coupled to receive said another one of said output signals from the circuit, said output of said first gate being coupled to said second one of said plurality of inputs of said third means.

5. The data analyzer according to claim 4 wherein said first gate of said second means further includes a third input coupled to receive an output signal from a previous data register of said plurality of data registers.

6. The data analyzer according to claim 1 wherein said third means includes is a multiplexer.

7. The data analyzer according to claim 1 wherein said third means includes a fourth one of said plurality of inputs being coupled to said output of said fourth means.

8. The data analyzer according to claim 1 wherein said fourth means includes is a shift register.

9. A data register for performing both comparison analysis and signature analysis on a data bit, the data register having an input and an output, comprising:

first means for comparing the data bit with an expected data bit, said first means providing a predetermined logic level at an output when the data bit and said expected data bit are logically different;

second means for combining the data bit with at least one other data bit, said second means having an output;

third means responsive to a control signal for passing to an output of said third means one of (i) said output of said first means, (ii) said output of said second means, or (iii) a signal appearing at the input of the data register, said third means having first, second and third inputs, said first input of said third means being coupled to said output of said first means, said second input of :said third means being coupled to said output of said second means, said third input of said third means being coupled to the input of the data register; and fourth means for latching a signal appearing at said output of said third means, said fourth means having an input coupled to said output of said third means, said fourth means having an output coupled to the output of the data register.

10. The data analyzer according to claim 9 wherein said first means includes a first gate having first and second inputs and an output, said first input of said first gate being coupled to receive the data bit, said second input of said first gate being coupled to receive said expected data bit, said output of said first gate being coupled to said first input of said third means.

11. The data analyzer according to claim 10 wherein said first means further includes a second gate being coupled between said output of said first gate and said third means, said second gate having first and second inputs and an output, said first input of said second gate being coupled to said output of said first gate, said second input of said second gate being coupled to said output of said fourth means, said output of said second gate being coupled to said first input of said third means.

12. The data analyzer according to claim 9 wherein said second means includes a first gate having first and second input and an output, said first input of said first gate being coupled to receive the data bit, said second input of said first gate being coupled to receive said at least one other data bit, said output of said first gate being coupled to said second input of said third means.

13. The data analyzer according to claim 12 wherein said first gate of said second means further includes a third input coupled to receive an additional data bit.

14. The data analyzer according to claim 9 wherein said third means includes is a multiplexer.

15. The data analyzer according to claim 9 wherein said third means includes a fourth one of said plurality of inputs being coupled to said output of said fourth means.

16. The data analyzer according to claim 9 wherein said fourth means includes is a shift register.

* * * * *